(12) United States Patent
Laskin et al.

(10) Patent No.: US 10,518,358 B1
(45) Date of Patent: Dec. 31, 2019

(54) MULTI-FOCUS OPTICS

(71) Applicant: AdlOptica Optical Systems GmbH, Berlin (DE)

(72) Inventors: Alexander Laskin, Berlin (DE); Vadim Laskin, Berlin (DE)

(73) Assignee: ADLOPTICA OPTICAL SYSTEMS GMBH, Berlin (DE)

( * ) Notice: Subject to any disclaimer, the term of this patent is extended or adjusted under 35 U.S.C. 154(b) by 371 days.

(21) Appl. No.: 15/008,752

(22) Filed: Jan. 28, 2016

(51) Int. Cl.
*B23K 26/21* (2014.01)
*B23K 26/082* (2014.01)
(Continued)

(52) U.S. Cl.
CPC .......... *B23K 26/21* (2015.10); *B23K 26/0006* (2013.01); *B23K 26/0643* (2013.01);
(Continued)

(58) Field of Classification Search
CPC ...... B23K 26/02; B23K 26/06; B23K 26/067; B23K 26/21; B23K 26/0869;
(Continued)

(56) References Cited

U.S. PATENT DOCUMENTS

| | | |
|---|---|---|
| 4,566,762 A | 1/1986 | Kato |
| 5,142,411 A | 8/1992 | Fiala |

(Continued)

FOREIGN PATENT DOCUMENTS

| | | |
|---|---|---|
| DE | 19846368 | 4/2000 |
| WO | 1991014189 | 9/1991 |
| WO | 2014079478 | 5/2014 |

OTHER PUBLICATIONS

Smith, W., Modern Optical Engineering, The Design of Optical Systems, McGraw-Hill, 2000, 12 pages.
(Continued)

*Primary Examiner* — Michael Robinson
(74) *Attorney, Agent, or Firm* — Brian S. Steinberger; Hilary F. Steinberger; Law Offices of Brian S. Steinberger, P.A.

(57) ABSTRACT

Methods, systems, devices and apparatus for laser processing of transparent or partially transparent materials by focusing laser radiation on a surface of a material workpiece or inside the material workpiece and creating elongated processed regions with variable and controlled depth using focusing optical system with air-spaced optical components, forming three or more multiple focuses along the optical axis and compensating aberrations induced while light focusing inside the material workpiece. The focusing optical system can have an aplanatic design, with lenses made from birefringent materials combined with lenses from isotropic materials, or objectives, or zoom optical system, or waveplates. Material processing effects such as material disruption or modification of material properties are produced due to the interaction of focused laser radiation with material in elongated volume processed regions and are multiple repeated along the processing path by relative motion between the material workpiece and the focusing optical system being realized with a scanning device.

9 Claims, 6 Drawing Sheets

(51) Int. Cl.
*B23K 26/08* (2014.01)
*B23K 26/06* (2014.01)
*B23K 26/00* (2014.01)
*B23K 103/02* (2006.01)
*B23K 103/08* (2006.01)
*B23K 103/00* (2006.01)

(52) U.S. Cl.
CPC ........ *B23K 26/0648* (2013.01); *B23K 26/082* (2015.10); *B23K 26/083* (2013.01); *B23K 26/0869* (2013.01); *B23K 2103/02* (2018.08); *B23K 2103/08* (2018.08); *B23K 2103/42* (2018.08); *B23K 2103/52* (2018.08); *B23K 2103/54* (2018.08)

(58) Field of Classification Search
CPC .............. B23K 26/0648; B23K 26/083; B23K 26/082; B23K 26/0006; B23K 26/0643
See application file for complete search history.

(56) References Cited

U.S. PATENT DOCUMENTS

| | | | |
|---|---|---|---|
| 5,690,845 A | 11/1997 | Fuse | |
| 6,057,970 A | 5/2000 | Kim et al. | |
| 6,504,130 B1 | 1/2003 | Okada | |
| 6,992,026 B2 | 1/2006 | Fukuyo et al. | |
| 7,396,742 B2 | 7/2008 | Fukuyo et al. | |
| 7,402,773 B2 | 7/2008 | Nomaru | |
| 7,547,613 B2 | 6/2009 | Fukuyo et al. | |
| 7,592,238 B2 | 9/2009 | Fukuyo et al. | |
| 7,615,721 B2 | 11/2009 | Fukuyo et al. | |
| 7,732,730 B2 | 6/2010 | Fukuyo et al. | |
| 7,749,867 B2 | 7/2010 | Fukuyo et al. | |
| 7,825,350 B2 | 11/2010 | Fukuyo et al. | |
| 8,134,099 B2 | 3/2012 | Nakano et al. | |
| 8,143,141 B2 | 3/2012 | Sugiura et al. | |
| 8,183,131 B2 | 5/2012 | Fukuyo et al. | |
| 8,227,724 B2 | 7/2012 | Fukuyo et al. | |
| 8,389,891 B2 | 3/2013 | Bovatsek et al. | |
| 8,513,567 B2 | 8/2013 | Osajima et al. | |
| 8,852,698 B2 | 10/2014 | Fukumitsu | |
| 8,890,027 B2 | 11/2014 | Fukuyo et al. | |
| 8,946,591 B2 | 2/2015 | Fukuyo et al. | |
| 8,946,592 B2 | 2/2015 | Fukuyo et al. | |
| 8,969,752 B2 | 3/2015 | Fukumitsu et al. | |
| 8,969,761 B2 | 3/2015 | Fukuyo et al. | |
| 2001/0045419 A1* | 11/2001 | Dunsky | B23K 26/02 219/121.76 |
| 2005/0006361 A1* | 1/2005 | Kobayashi | B23K 26/0676 219/121.73 |
| 2006/0250607 A1* | 11/2006 | Takahashi | G01M 11/0264 356/124 |
| 2006/0289410 A1* | 12/2006 | Morita | B23K 26/03 219/121.67 |
| 2011/0110204 A1* | 5/2011 | Hashizume | G11B 7/08564 369/44.23 |
| 2013/0126573 A1 | 5/2013 | Hosseini et al. | |

OTHER PUBLICATIONS

Born, M., et al., Principals of Optics, Electromagnetic Theory of Propagation, Interference and Diffraction of Light, Pergamon Press 1970, 15 pages.

\* cited by examiner

Focusing by an aberration-free lens
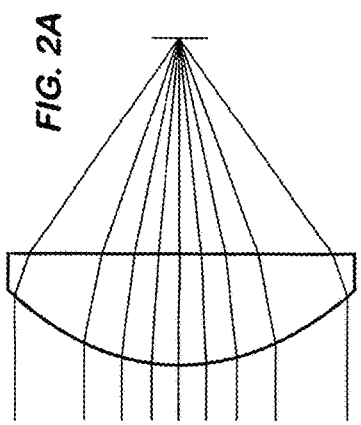
FIG. 2A
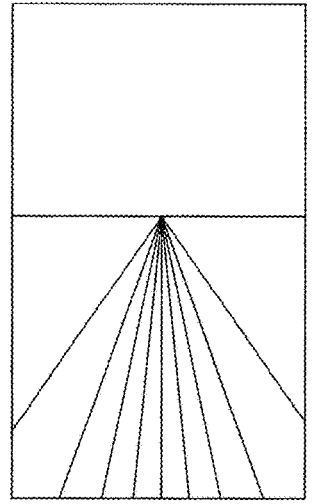
Focused Beam
FIG. 2B — in air
FIG. 2C — inside sapphire depth 0.8mm
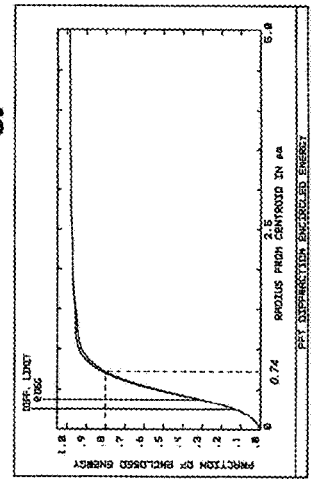
Spot View
FIG. 2D
FIG. 2E
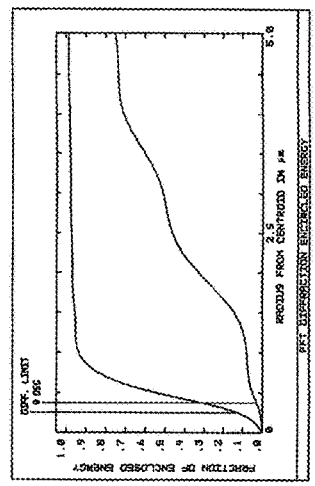
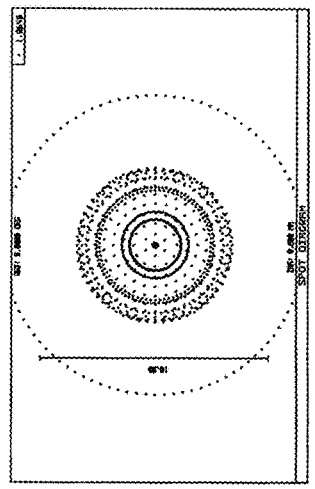
Encircled Energy
FIG. 2F
FIG. 2G

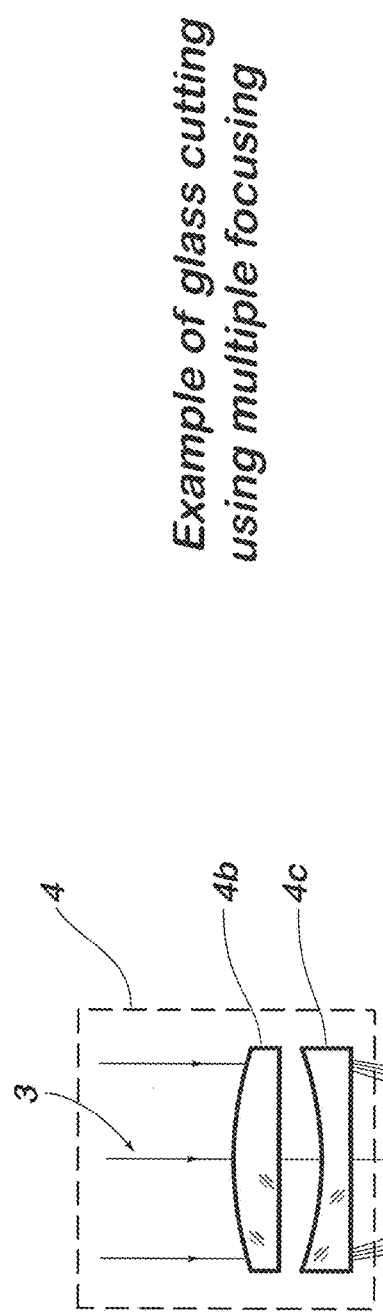
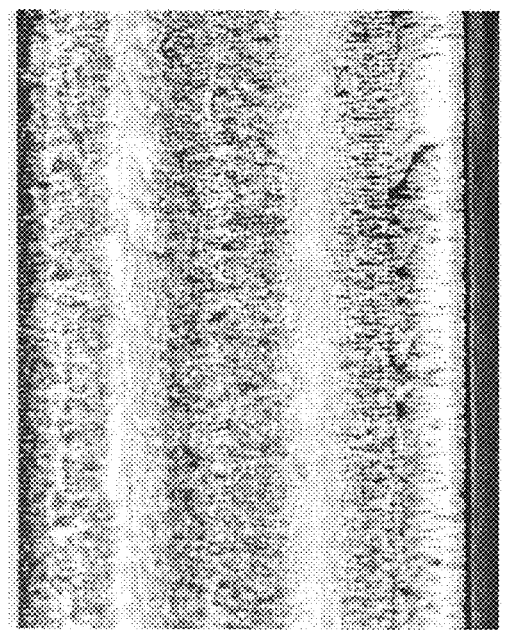
*Example of glass cutting using multiple focusing*
FIG. 6
Focusing inside glass
FIG. 7
FIG. 8
Glass edge view after cutting

MULTI-FOCUS OPTICS

FIELD OF INVENTION

The present invention relates to the field of optics, and more particular to methods, apparatuses, devices and systems for laser material processing for cutting, welding, scribing and drilling of non-metallic and metallic materials, and in particular, brittle materials, with multi-focus optics.

BACKGROUND TO THE INVENTION

Lasers are widely-used in various industrial material processing techniques due to the capability to provide high energy concentration in a spot by focusing of a laser beam. The physical effects happening while interaction of material and concentrated laser energy can lead to necessary processing effects; such as for example, melting and evaporation of metals and non-metallic materials like glass, Carbon Fiber Reinforced Polymers (CFRP) are important in laser welding and cutting applications. However, material disruption can occur due to multiphoton absorption or thermal stress is used in laser technologies of cutting, chamfering, singulation, dicing, drilling of brittle materials, for example various types of glasses, sapphire, silicon, other transparent and semi-transparent materials, as well as multilayer structures.

Focusing of a laser beam on a workpiece surface or inside bulk material is a popular used approach in laser processing technologies. Therefore, the task of optimizing laser radiation focusing in order to improve the performance of laser technologies and increase the productivity is an important industrial task.

A method of processing the brittle materials such as glass or sapphire, through internal focusing and creating material disruption or modification is described in U.S. Pat. Nos. 7,749,867 and 8,183,131 to Fukuyo et al. which include scanning of focused laser beams along a processing path there is created a processed region inside the bulk material, from which the material separation starts while further processing.

Among methods attempting to improve the quality and controllability of the processing there is used a method of multi-step processing described in U.S. Pat. Nos. 6,992,026, 7,396,742, 7,547,613, 7,592,238, 7,615,721, 7,732,730, 7,825,350, 8,227,724, 8,946,591, 8,946,592, 8,969,752, 8,969,761 all to Fukuyo et al.; U.S. Pat. No. 8,134,099 to Nakano et al with, the scanning of focused beam is repeated for the same processing path with changing the focusing depth on each step.

This multi-step approach works well especially for thick materials. U.S. Pat. No. 8,890,027 to Fukuyo et al. describes its application to process multilayer materials when separated in depth processed regions to be created. However, there are disadvantages of this method, such as increasing of processing time, high tolerances for alignment between processing paths on each step, and high roughness of the cutting edge reducing the bending strength.

To overcome these disadvantages there are proposed methods of creating elongated processed region by one step of scanning of focused beam. U.S. Patent Application No. 2013/0126573 to Hosseini et al. describes a method of processing by filamentation happening inside bulk material by focusing of ultra-short pulse laser beam. WO/2014/079478 to Bhuyan et al. describes a method of processing using so called Bessel beams, which are characterised by high intensity in proximity to optical axis along certain length being defined by optical system applied. As such, there is created a needle-like processed region along optical axis. Common disadvantages of those methods include complexity and high costs of realization, tough tolerances to specifications of laser radiation, and difficulty to control the depth of the processed region.

Other proposed methods of material processing imply creating multiple processed areas along optical axis by each laser pulse. U.S. Pat. No. 8,389,891 to Bovatsek et al. and DE Patent No. 198 46 368 to Berger et al. describes optical systems based on diffractive optical elements (DOE) and creating two or several focuses. The disadvantages of DOE-based optical systems can include high initial manufacturing costs, limited efficiency and low resistance to powerful laser radiation, especially to widely-used ultra-short pulse lasers, and sensitivity to input beam size and quality. The DOE can efficiently be used with single-mode ($TEM_{00}$) lasers only. DOE demonstrate low efficiency with multimode lasers. U.S. Pat. No. 8,143,141 to Sugiura et al, U.S. Pat. No. 8,852,698 to Fukumitsu, and U.S. Pat. No. 8,513,567 to Osajima et al. present methods based on multiphoton absorption effect by optimizing laser specifications and parameters of focusing optics to create a microcavity and elongated molten processed region. The tough tolerances to laser specifications and limited number of materials that can be processed are disadvantages of these methods.

Another approach is based on using optical systems creating two or more focuses. U.S. Pat. No. 5,690,845 Fuse describes mirror or lens-based optics for splitting the beam through difference of properties of different parts of an optical component working aperture. The methods can use different dioptric power because of different curvature of optical surface of a lens or a mirror. The manufacturing of such optics can be complex and expensive. Another disadvantage is the presence of junction between parts of the optical surface, which reduces resistance to powerful laser radiation, especially to widely-used ultra-short pulse lasers.

Other solutions include creating multiple focuses can be based on optical systems comprising lens or lenses made from birefringent materials. WO/1991/014189 and U.S. Pat. No. 5,142,411 both to Fiala describe cemented multifocal intraocular lenses (IOL) from polymer materials used to extend the eyesight depth of field. However, the IOL cannot be applied in laser material processing because these optics are cemented and made from polymers. U.S. Pat. No. 6,057,970 to Kim et al. describes an optical system for semiconductor lithography with a birefringent lens to create two focuses and extend the depth of field. Another example of using a birefringent lens is a two-focus imaging system described in U.S. Pat. No. 4,566,762 to Kato.

U.S. Pat. No. 7,402,773 to Nomaru describes a laser processing machine shown in FIG. 1 having a laser P2, a mirror P4 reflecting a laser beam P3, a birefringent lens P5 being cemented with a glass lens P6, an objective P7 focusing the laser radiation inside a material workpiece P1 in two separate focuses $W_1$ and $W_2$, with the scanning of the focused beam is realized through a scanning device P8. A disadvantage is using cemented optics, which reduces resistance to powerful laser radiation, especially to widely-used ultra-short pulse lasers. The optical system provides two separate focuses only with fixed distance between them. Thus, it is impossible to change the length of elongated processed region by increasing the focuses number and changing distance between focuses. This sets a limitation on thickness of materials to be processed and requires the repetition of processing path in case of thick materials, which reduces the process productivity.

A disadvantage of conventional technical solutions is the absence of ways to compensate aberrations induced by a transparent material workpiece while light focusing inside the said workpiece. Conventional solutions processing effects presume high energy concentration, which is provided by focusing of a laser beam in a small spot, typically few microns size, using optical systems of high numerical aperture (NA). Typically, initial designs of optical systems uses beam focusing in air, while many conventional material processing solutions use the beam focusing inside transparent materials. In case of high NA of focused beam there appears a strong spherical aberration that leads to spreading of laser energy and reducing of efficiency of material processing, which is illustrated in FIGS. 2A, 2B, 2C, 2D, 2E, 2F and 2G.

These figures show results of calculations using optical design software for a laser beam at 1064 nm wavelength being focused by an aberration-free lens with NA0.5 in air and at depth 0.8 mm inside sapphire. Similar results can be achieved for a microscope objective with NA0.5. FIG. 2A shows focusing lines with an aberration-free lens.

FIGS. 2B-2C shows a ray trace near focus, with FIG. 2B showing a focussed beam in air, and FIG. 2B shows a focussed beam inside a sapphire depth (0.8 mm) data.

FIGS. 2D-2E show spot views in a working plane that is a plane of maximum energy concentration with FIG. 2D showing a spot view in air and FIG. 2E showing a spot view inside a sapphire depth (0.8 mm).

FIGS. 2F-2G shows graph diagrams of encircled energy in the working plane.

FIG. 2F shows images that relate to focusing in air. FIG. 2G shows graph diagrams inside sapphire.

The lens can be aberration-free in air. Therefore, while focusing in air, it provides diffraction-limited spot size and maximum achievable energy concentration that can be characterized by a circle diameter where more than 80% of energy is concentrated, and in the considered example the characteristic diameter is 1.5 μm.

When focusing the laser beam using that lens inside sapphire the resulting spot size can be defined by spherical aberration and is several times larger than the diffraction limited one. This has, inevitably, an influence on concentration of laser energy—the characteristic diameter is more than 10 μm and, hence, intensity is about 50 times less than one in case of focusing in air.

Further analysis shows that the higher is optics NA or deeper focusing inside processed materials, the larger is the spherical aberration and, hence, stronger energy dissipation. Evidently this aberration effect should be taken into account in technical solutions implying laser beam focusing inside transparent materials and optical design of focusing optics needs to compensate aberration appearing in case of deep focusing.

From the point of view of modern requirements to material processing using laser beam focusing the conventional techniques are not optimal. As such, there is needed an efficient affordable method, apparatus and system capable to provide variable depth of elongated processed region, reliable control of the processed region depth, variable number of focuses, adaptation to variable focusing depth and compensation of aberration appearing in case of focusing inside bulk material, for the optical system design to comprise air-spaced optical components.

SUMMARY OF THE INVENTION

A primary object of the present invention is to provide methods, systems, devices and apparatus for laser processing of materials by focusing laser radiation on a surface of the material workpiece or inside bulk material of a workpiece, creating an elongated processed region while providing variable and controlled depth of the processed region and compensating aberrations appearing while laser light focusing in bulk material.

Advantageously an elongated processed region can be created by focusing laser radiation using optical systems having lenses made from birefringent materials and forming multiple focuses along the optical axis of the said optical system. The effect of material processing can be produced due to interaction of focused laser radiation with material in volume and is multiple repeated along the processing path by relative motion between the material workpiece and the said focused laser beam. Advantageously the material to be processed is transparent or partially transparent for the said laser radiation.

A secondary object of the present invention is to provide methods, systems, devices and apparatus for laser processing of materials by focusing laser radiation using an optical system forming at least three separate focuses. Due to simultaneous focusing of laser radiation in multiple focuses along optical axis inside the bulk material there can be an elongated processed volume region, which makes it possible to reduce the number of processing passes and increase processing speed.

A third object of the present invention is to provide methods, systems, devices and apparatus for laser processing of materials by focusing laser radiation using an optical system having at least two lenses made from birefringent materials. Optimizing the design of the optical system can make it possible to realize three or other required numbers of focuses separated by definite distances, which provides optimum conditions for materials processing with precisely controlled length of the elongated processed region.

A fourth object of the present invention is to provide methods, systems, devices and apparatus for laser material processing by focusing laser radiation in multiple focuses in bulk material by a focusing optical system having at least one movable lens or lens group which motion is used to adapt the optical design of the said focusing optical system to compensate aberrations happening while light focusing inside the said material. The compensation of aberrations can be provided for all created separate focuses, which guarantees equal conditions of processing in different depths inside the bulk material under processing. Depending on setting of the movable lens or lens group of the focusing optical system, there is provided in a control manner either full compensation, or overcompensating, or undercompensating of aberrations induced by light focusing inside the processed material which is used to optimize process conditions for particular laser technologies.

A fifth object of the present invention is to provide methods, systems, devices and apparatus for laser material processing by focusing of laser radiation in three or more multiple focuses in order to realize material disruption happening in elongated volume around each focus. Due to multiple disruptions along the processing path there occurs a separation of parts in the material workpiece.

A sixth object of the present invention is to provide methods, systems, devices and apparatus for laser material processing by focusing laser radiation in three or more multiple focuses in order to realize modification of material properties without the material disruption in elongated volume around each focus. This type of processing is important in techniques without separation of material parts, for example welding of glass or controlled variation of refractive index of glass to achieve particular polarization effects.

The apparatus, device and system of the preferred but non-limiting embodiment of the present invention being adapted to receive light from a laser source, to process a material workpiece and comprising at least one focusing optical system forming three or more multiple focuses along the optical axis and a scanning device providing relative motion between the material workpiece and the focused laser beam in order to realize the material processing effect along a processing path.

A seventh object of the present invention is to provide methods, systems, devices and apparatus for laser material processing by focusing laser radiation using a focusing optical system forming three or more multiple focuses, which is built from air-spaced optical components made from isotropic and birefringent materials. This provides high resistance of the focusing optical system to powerful laser radiation, especially with widely-used ultra-short pulse lasers.

An eighth object of the present invention is to provide methods, systems, devices and apparatus for laser material processing by focusing laser radiation using a focusing optical system forming three or more multiple focuses with at least two lenses made from birefringent materials. The focusing optical system can be implemented as a pair of birefringent lenses, or as a system from more than two birefringent lenses, or as various combinations of birefringent lenses with lenses formed from isotropic materials. Optimizing design of optical components of those combined focusing optical systems (dioptric powers, reciprocal location) makes it possible to provide three or any other required number of focuses separated by distances being optimum for particular laser technologies.

A ninth object of the present invention is to provide methods, systems, devices and apparatus for laser material processing by focusing laser radiation using a focusing optical system forming three or more multiple focuses with waveplates to optimize the polarization state of the laser beam. Waveplates can be located before or after the focusing optical system, or between lenses of the focusing optical system. Turning of the waveplates makes it possible to change energy distribution in various polarization directions and control energy portions in different focuses.

A tenth object of the present invention is to provide methods, systems, devices and apparatus for laser material processing by focusing laser radiation using the focusing optical system forming three or more multiple focuses, with optical components being movable along the optical axis to vary the dioptric power of the said focusing optical system, which leads to variation of distances between multiple focuses. Tuning those distances makes it possible to optimize parameters of particular material processing technologies.

An eleventh object of the present invention is to provide methods, systems, devices and apparatus for laser material processing by focusing laser radiation using the focusing optical system forming three or more multiple focuses and combined from an objective and a quasi-afocal optical system with at least two birefringent lenses. This combination makes it possible to solve separately the tasks of beam focusing by the objective and splitting of a beam by the quasi-afocal optical system to parts focused in different focuses.

A twelfth object of the present invention is to provide methods, systems, devices and apparatus for laser material processing by focusing laser radiation using the focusing optical system forming three or more multiple focuses and combined from an objective and a quasi-afocal optical system, with at least two birefringent lenses, wherein the objective presents a zoom optical system. This provides the possibility to vary the distance between multiple focuses and optimize parameters of particular material processing technologies.

A thirteenth object of the present invention is to provide methods, systems, devices and apparatus for laser material processing by focusing laser radiation using the focusing optical system forming three or more multiple focuses, with at least one movable lens or lens group which motion is used to adapt the optical design of the focusing optical system to compensate coma aberration and spherical aberration happening while light focusing inside the material. The compensation of aberrations is provided for all created separate focuses which guarantees equal conditions of processing in different depths inside the bulk material under processing and maximized concentration of laser energy in multiple focuses, minimized losses and low sensitivity to misalignments of the focusing optical system with respect to a laser beam. Depending on the setting of the movable lens or lens group of the focusing optical system there is provided in a control manner either full compensation, or overcompensating, or undercompensating of aberrations induced by light focusing inside the processed material, which is used to optimize process conditions for particular laser technologies.

A fourteenth object of the present invention is to provide methods, systems, devices and apparatus for laser material processing by focusing laser radiation using the focusing optical system forming three or more multiple focuses and combined from an objective, a quasi-afocal optical system having at least two birefringent lenses, and a scanning device located between the objective and quasi-afocal optical system. This embodiment makes it possible to apply widely-used mirror-based or other scanners for two-dimensional scanning of focused beam over an unmoved workpiece of material.

A fifteenth object of the present invention is to provide methods, systems, devices and apparatus for laser material processing by focusing laser radiation using the focusing optical system forming three or more multiple focuses, wherein the scanning device realizes motion of the focusing optical system over unmoved workpiece being held using a holding device. Scanning of the focused beam provides repeating of the processing effect along a processing path.

A sixteenth object of the present invention is to provide methods, systems, devices and apparatus for laser material processing by focusing laser radiation using the focusing optical system forming three or more multiple focuses, wherein the scanning device realizes motion of a material workpiece with respect to the focusing optical system in order to provide repeating of the processing effect along the processing path.

A seventeenth object of the present invention is to provide methods, systems, devices and apparatus for laser material processing by focusing laser radiation using the focusing optical system forming three or more multiple focuses, wherein the sequence of the laser pulses is synchronized with the relative motion between the material workpiece and the focused laser beam in order to provide the material processing along the processing path by a single pass.

Embodiments of the apparatus, devices, systems and methods for realizing beam shaping of focused beams are described.

One skilled in the relevant art will recognize, however, that the invention can be practiced without one or more of the specific details, or with other methods, components, materials, etc. In other words, well-known structures, materials, or operations are not shown or described in detail to avoid obscuring aspects of the invention.

Further objects and advantages of this invention will be apparent from the following detailed description of the presently preferred embodiments which are illustrated schematically in the accompanying drawings.

BRIEF DESCRIPTION OF THE DRAWINGS

The invention is illustrated, without limitation, by the accompanying drawings, which are briefly described below.

FIG. 2A shows focusing lines with an aberration-free lens.

FIGS. 2B-2C shows a ray trace near focus, with FIG. 2B showing a focussed beam in air, and FIG. 2B shows a focussed beam inside a sapphire depth (0.8 mm) data.

FIGS. 2D-2E show spot views in a working plane that is a plane of maximum energy concentration with FIG. 2D showing a spot view in air and FIG. 2E showing a spot view inside a sapphire depth (0.8 mm).

FIGS. 2F-2G shows graph diagrams of encircled energy in the working plane. FIG. 2F shows images that relate to focusing in air. FIG. 2G shows graph diagrams inside sapphire.

FIG. 6 is a schematic diagram of a focusing part of an apparatus according to one embodiment of the present invention for creating four separate focuses.

FIG. 7 shows micrographs of material processing with the four separate focuses.

FIG. 8 shows micrograph of glass edge views after cutting using methods according to the present invention.

DETAILED DESCRIPTION OF THE INVENTION

Figure 1:
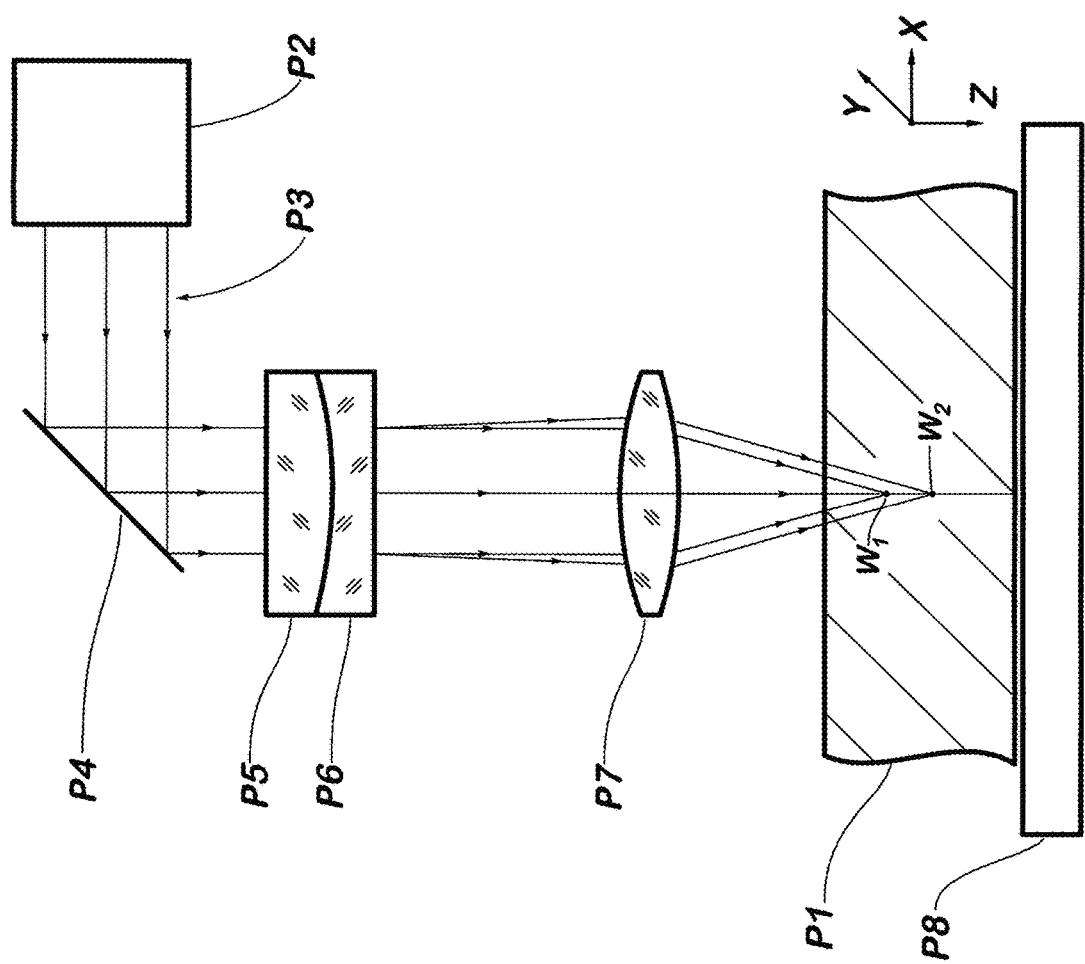
FIG. 1 is a schematic diagram showing a prior art laser processing machine with two separated focuses.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figures and the various embodiments used to describe the principles of the present invention are by way of illustration and should not be construed in any way to limit the scope of the invention. Those skilled in the art will understand that the principles of the present invention may be implemented in a variety of laser devices.

The following list of reference numerals is used in the description and the drawings to identify components:
1 workpiece of material to be processed
2, 3 laser beam
4 focusing optical system forming multiple focuses
   4a mirror
   4b, 4c, 4d lenses made from birefringent materials
   4e objective or zoom objective
   4f waveplate
   4g F-theta objective, or another objective of a scanning system
   4i, 4j mirrors of a scanner
5 scanning device According to the present invention there are realized various optical systems for laser material processing by focusing laser radiation using a focusing optical system forming simultaneously three or more multiple focuses on a surface of the material workpiece or inside the workpiece.

Due to physical effects happening by interaction of focused laser radiation and bulk material there appears a certain processing effect in volume around each focus, and combination of processing effects in whole ensemble of focuses leads to creating an elongated processed region. This makes it possible to reduce number of processing passes and, increase the processing speed. Depending on intensity of laser radiation in focus areas the processing effect can present either material disruption or modification of material properties.

Material disruption due to multiphoton absorption or thermal stress is necessary in various laser processing technologies for material separation, like cutting, chamfering, dicing, drilling of advantageously transparent and semi-transparent brittle materials, such as for example various types of glasses, sapphire, silicon, as well as multilayer structures or polymer materials like CFRP. Local melting of material by focused beams is used in welding technologies for glass and metals. Another example of material properties modification by focused beams is changing the refractive index of glass.

The method according to the present invention can be used for cutting and welding of metals as well. Performance of these laser technologies can be improved by splitting a laser beam energy and focusing at different material depth, which is described, for example, in U.S. Pat. No. 6,504,130 to Okada, which is incorporated by reference in its' entirety. Okada '130 describes a method of laser cutting by oscillating focus depth. Instead of oscillating focus the method according to the present invention provides simultaneous focusing of laser energy in different focused spots, which is easy to realize in existing laser equipment to improve quality of a cut.

According to the present invention the elongated process region is created by focusing laser radiation using an optical system with lenses made from birefringent materials. These materials, advantageously optical crystals, are widely-used in science and industry to realize various effects relating to polarization of light. A well-known feature of birefringent crystals is dependence of refractive index on reciprocal orientations of crystal optical axes and light polarization planes. This feature is sufficiently described in literature (Smith, W. J., Modern Optical Engineering, McGraw-Hill, New York, 2000; Born, M. and Wolf, E., Principles of Optics, 7th edn., Cambridge University Press, Cambridge, 1999).

For example, the refractive index difference of uniaxial crystals is used to introduce phase front retardation in waveplates in order to change polarization state of light. When making a lens from birefringent material there appears a possibility to create separate focuses along the lens optical axis corresponding to different waves appearing while light refraction on lens surfaces and propagation inside the lens.

As a non-limiting example, if the lens is made from an uniaxial crystal and the crystal optical axis is perpendicular to the lens optical axis, and the collimated incident light is unpolarized, or circularly polarized, or elliptically polarized, or partially polarized, or linearly polarized with an angle between the crystal optical axis and the incident light polarization plane other than 0° or 90°, there appear two separate focuses. Energy portions in these focuses are equal if the incident light beam is unpolarized, or circularly polarized, or elliptically polarized with 45° angle between the crystal optical axis and planes of ellipse axes, or linearly polarized with 45° angle between the crystal optical axis and the incident light polarization plane. If the incident light beam is linearly polarized and the angle between the polarization plane and the crystal optical axis is 0°, or 90°, there appears only one focus. In other cases of incident light polarization state and reciprocal orientations of crystal optical axes and light polarization planes the energy portions in separate focuses are not equal.

Combining several lenses from birefringent materials makes it possible to create a focusing optical system with multiple focuses. The number of focuses depends on number of birefringent lenses, with the maximum number of focuses $N_{max}$ is equal to $2^L$, where L is number of birefringent lenses; varying proportion of dioptric powers of lenses and distance between them makes it possible to provide less than $N_{max}$ focuses.

The method according to the present invention can be realized by various optical systems, several embodiments will now be described.

Figure 3:
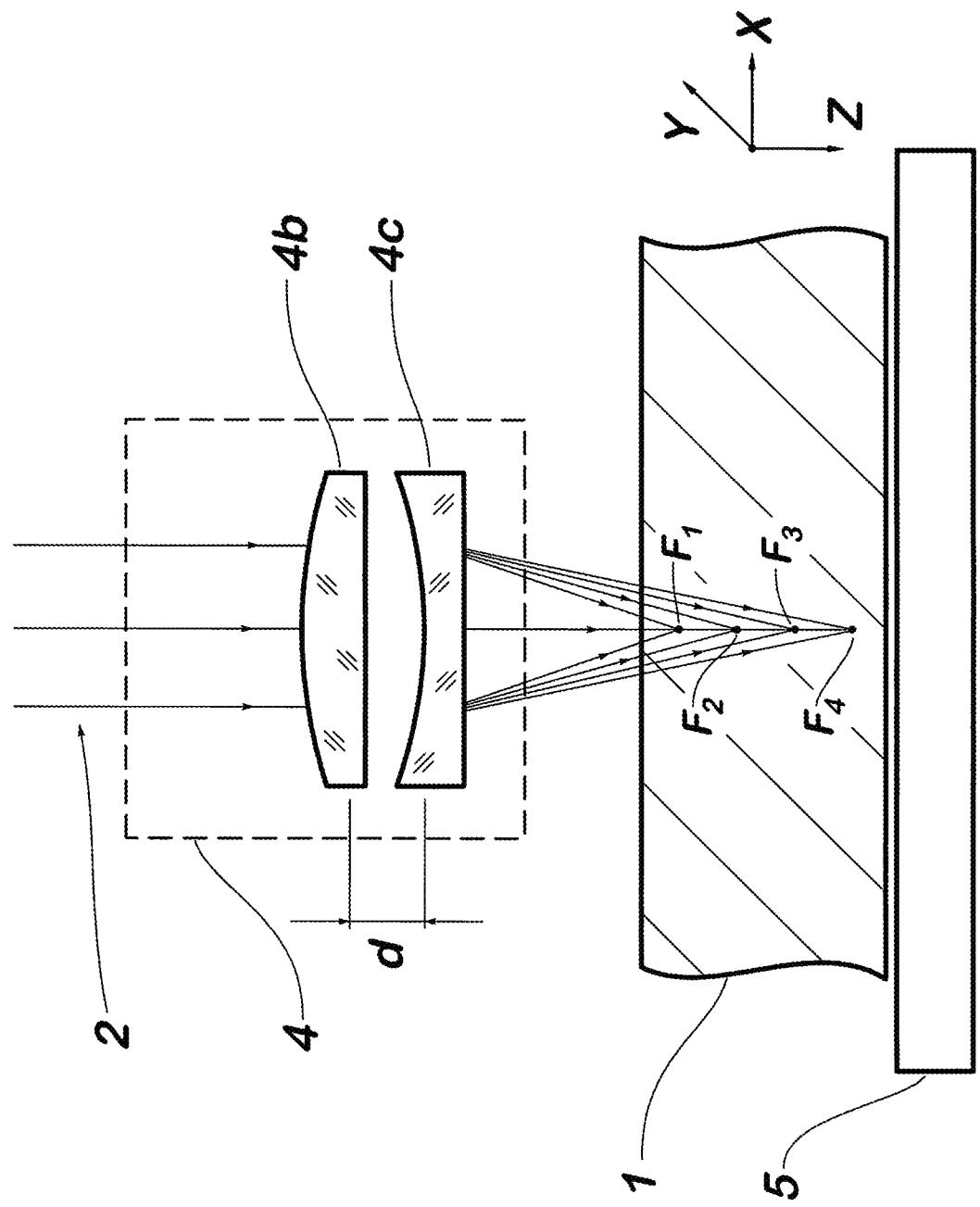
FIG. 3 is a schematic diagram of an apparatus realizing the method for laser material processing by generation of multiple focuses according to one non-limiting embodiment of the present invention when the focusing optical system includes two lenses from birefringent materials, and four separate focuses are created.

According to one, non-limiting, embodiment of the present invention, depicted in FIG. 3, the focusing optical system 4 is composed from two birefringent lenses 4b and 4c. The system creates four separate focused spots $F_1$, $F_2$, $F_3$, $F_4$ by focusing the beam 2 inside workpiece of material 1. Scanning of the elongated processed region along processing path is realized by the scanning device 5. Depending on polarization state of the incident laser light and orientations of crystal optical axes of the lenses 4b and 4c it is possible to provide various combinations of energy portions in those separate focused spots $F_1$, $F_2$, $F_3$, $F_4$. The distances between those focused spots are defined by the optical design of the focusing optical system 4. As a non-limiting example, if the laser beam 2 is unpolarized and the angle between the crystal optical axes of the lenses 4b and 4c is 45°, there are provided equal portions of energy in the separate focused spots $F_1$, $F_2$, $F_3$, $F_4$. Varying dioptric power of lenses 4b and 4c and turning one of them make it possible to create three or two separate focused spots and vary distance between them. Thus, it is possible to optimize conditions of processing for particular laser technologies.

Modem laser processing technologies require building optical systems with definite numerical apertures (NA), focal lengths and angular field to process materials of different thicknesses using lasers with different beam quality and polarization state. To meet these requirements it is fruitful to combine different optical components. For example, objectives from isotropic materials, providing required NA, with optics from birefringent materials, used for beam splitting and focusing in separate focused spots, and waveplates to optimize polarization state of the laser beam.

Figure 4:
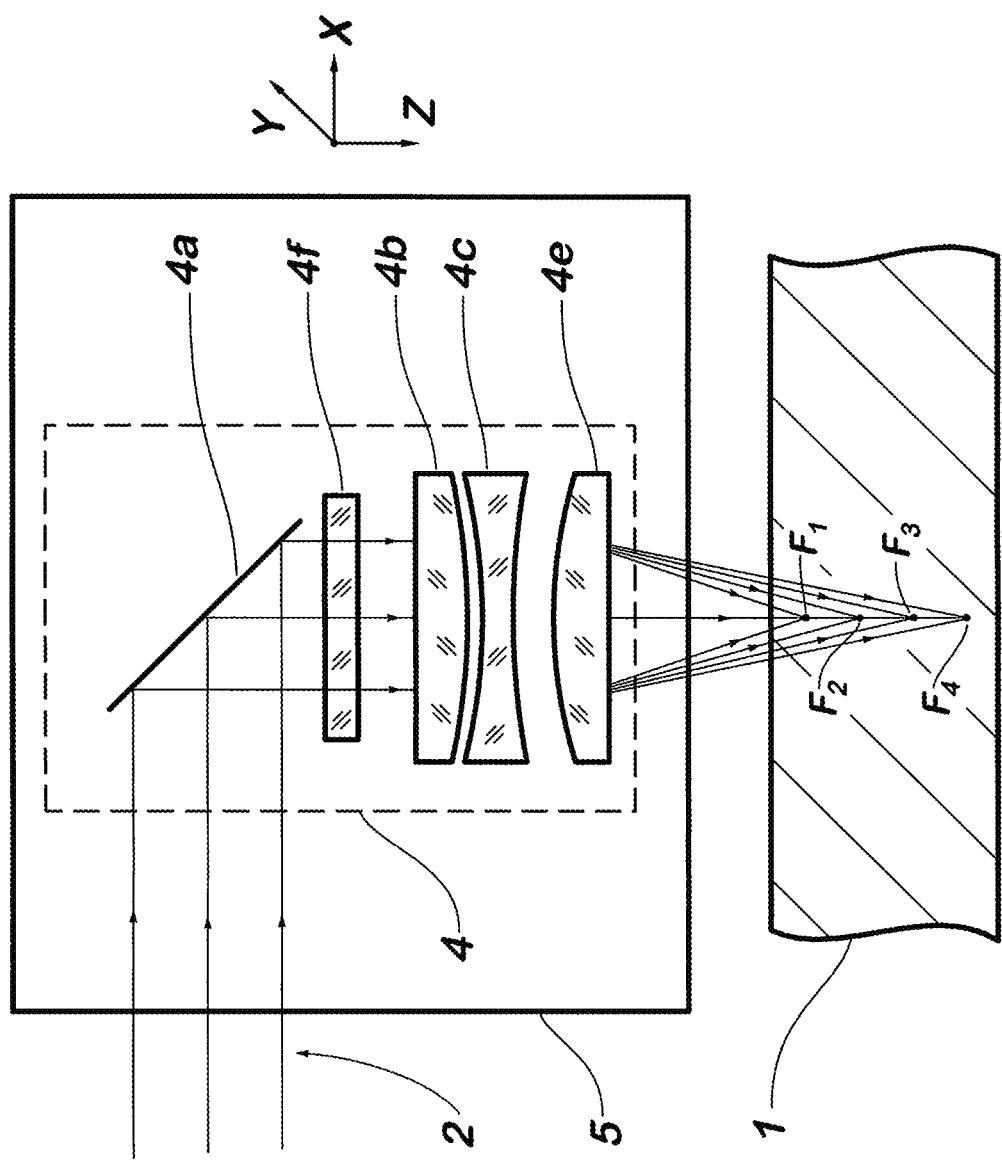
FIG. 4 is a schematic diagram of the apparatus for laser material processing by generation of multiple focuses according to another non-limiting embodiment of the present invention when the focusing optical system includes a mirror, two lenses from birefringent materials, an objective and a waveplate optimizing polarization state of the laser beam. There are created four separate focuses.

This approach is realized in another, non-limiting, embodiment of the present invention, depicted in FIG. 4. Here, the laser beam 2 is linearly polarized, the focusing optical system 4 can include a mirror 4a, a waveplate 4f, birefringent lenses 4b and 4c and objective 4e. Advantageously, the waveplate 4f is a quarter waveplate, which crystal optical axis is turned at 45° angle with respect to polarization plane of the laser beam 2. Thus, the waveplate 4f transforms the linearly polarized light to a circularly polarized one. The angle between the crystal optical axes of the lenses 4b and 4c is 45°. Hence, there are provided equal portions of energy in the separate focused spots $F_1$, $F_2$, $F_3$, $F_4$.

Locating a waveplate between the lenses of the focusing optical system 4, as a non-limiting example between birefringent lenses 4b and 4c, and turning the said waveplate around optical axis of the optical system makes it possible to control laser energy distribution in different polarization planes, and control energy portions in different focuses. Locating a waveplate after the focusing optical system 4 makes it possible to manipulate the polarization state of each separate focused beam in order to optimize process conditions for a particular laser technology.

A variety of laser technologies, with lasers used and materials to be processed lead to variety of required numbers of focused spots and distances between them. According to the present invention one can vary the distance between focused spots by implementing the focusing optical system 4 with optical components being movable along the optical axis, then the focal length of entire focusing optical system 4 is changed and the distance between focused spots is changed as well. As a non-limiting example, the lens 4c in the embodiment depicted in FIG. 3 is movable. According to theory of optical systems (Smith, W. J., Modem Optical Engineering, McGraw-Hill, New York, 2000), the focal length $f_4$ of entire focusing optical system 4 in the considered example can be expressed by a formula $$\frac{1}{f_4} = \frac{1}{f_{4b}} + \frac{1}{f_{4c}} - \frac{d}{f_{4b}f_{4c}}$$

where $f_{4b}$ and $f_{4c}$ are corresponding focal lengths of the lenses 4b and 4c, and $d$ is a distance between those lenses. As such, changing the distance d leads to changing of focal length $f_4$, that, in turn, results changing of distance between focused spots $F_1$, $F_2$, $F_3$, $F_4$ and, hence, optimize parameters of particular material processing technologies.

Another technique to vary distances between separate focuses is combining the birefringent lenses with an objective implemented as a zoom optical system, then variation of the objective focal length leads to variation of focal length of entire focusing optical system and changing the distances between focuses. This approach is illustrated by another, non-limiting, embodiment of the present invention, shown in FIG. 4. The objective 4e is implemented as a zoom lens. Therefore by changing its focal length there are provided variable distances between focused spots $F_1$, $F_2$, $F_3$, $F_4$ with saving the proportion between the said distances.

Due to features of interaction of laser radiation with materials to be processed the result of processing presents a stroke along the optical axis of the focusing system. Examples of processed regions are depicted in FIG. 6-8 with a layout of a four-focuses focusing optical system 4, receiving laser light 3.

FIG. 6 is a schematic diagram of a focusing part of an apparatus according to one embodiment of the present invention for creating four separate focuses.

FIG. 7 shows micrograph of material processing with the four separate focuses which demonstrates material modification in form of changing of glass refractive index.

FIG. 8 shows micrograph of glass edge views after cutting using ultra-short pulsed laser and methods according to the present invention.

Depending on type of processed material and laser specifications it is necessary to provide either close or separate location of processed strokes. In FIG. 6, the distance between focused spots $F_2$ and $F_3$ is chosen in such a way that by focusing laser radiation inside glass the corresponding processed strokes are close locating without gap, while the processed strokes from focused spots $F_1$ and $F_4$ are separated from middle strokes. Embodiments of the present invention, presuming moving of optical components of focusing system or applying zoom optics, provide variable distances between the processed strokes, which makes it possible realization of various elongated processed regions with separated, or close locating, or overlapping processed strokes. Thus, the focusing optical systems according to present invention provide an optimized processing strategy and control parameters of a particular laser technology.

Scanning of an elongated processed region along the processing path is an obligatory function in laser processing technologies like cutting, drilling, scribing, and can be realized by different ways. In the non-limiting embodiment of the present invention depicted in FIG. 3, the scanning device 5 provides scanning of the material workpiece 1 in X and Y coordinates with respect to unmoved focusing optical system 4 forming multiple focuses inside the said workpiece. This approach is widely-used in case of light workpieces.

According to another non-limiting embodiment of present invention shown in FIG. 4 the scanning device 5 provides controlled moving of the focusing optical system 4 over unmoved workpiece 1 in X and Y coordinates. This approach is used in case of heavy workpieces or when moving of an optical head, including the focusing optical system 4, provides high precision scanning.

Figure 5:
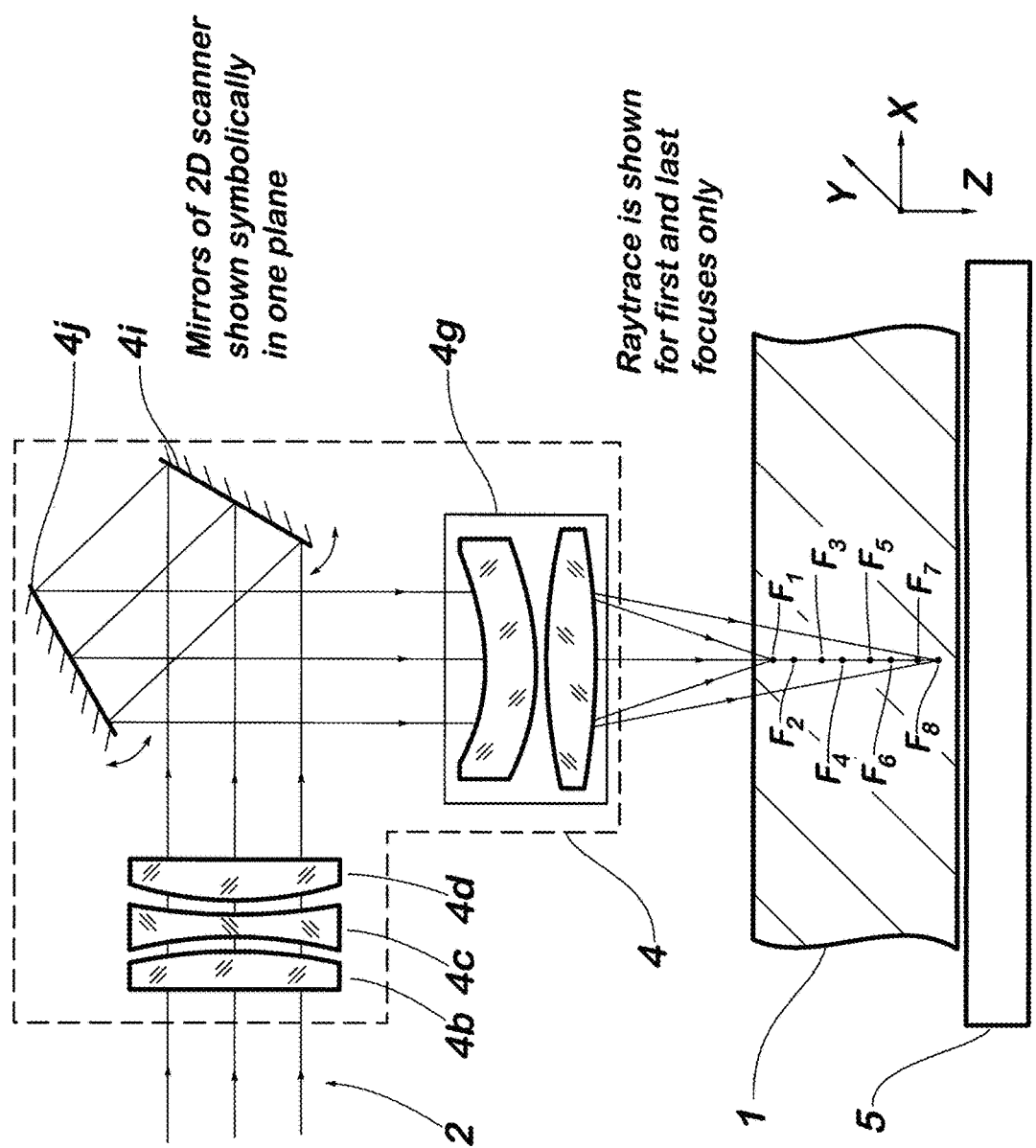
FIG. 5 is a schematic diagram of an apparatus for the laser material processing by generation of multiple focuses according to one more non-limiting embodiment of the present invention when the optical system includes a quasi-afocal part splitting the laser beam. An objective for focusing of laser radiation and a mirror based 2D scanner creates eight separate focuses.

One more scanning approach presumes combining of mechanical and optical scanning techniques. The non-limiting embodiment according to the present invention, realizing the scanning approach, is shown in FIG. 5. The optical scanning of the elongated processed region which is formed by focused spots $F_1$, $F_2$, $F_3$, $F_4$, $F_5$, $F_6$, $F_7$, $F_8$, over the workpiece 1 in X and Y coordinates is realized using scanning mirrors 4i, 4j and F-theta lens or another scanning lens 4g. The scanning device 5 can be used after finishing the optical scanning along the processing path to move the material workpiece 1 for the next session of processing using the optical scanning.

The focusing optical system 4 includes also a quasi-afocal optical system with birefringent lenses 4b, 4c, 4d and is located before the two-mirror scanner 4i, 4j. The quasi-afocal optical system splits the laser beam in parts which are later focused in separate spots $F_1$-$F_8$ using the objective 4g in form of F-theta lens or another scanning lens. By change of focal length of the objective 4g there are changed distances between focused spots $F_1$-$F_8$ as well as working field of optical scanning. Advantageously, the objective 4g is telecentric in order to provide normal incidence of focused laser radiation on the workpiece 1. This embodiment implies applying of widely-used components of laser processing equipment, like 2D-scanners, F-theta lenses, and is easily realized on the base of existing machines.

Scanning speed of the elongated processed regions is synchronized with pulse repetition rate in such a way the processed regions are placed one by one and are separated by a definite distance along the processing path. FIG. 8 shows a micrograph of the glass edge view after cutting, presents a non-limiting example of processing result with close location of processed regions. Optimum distance between processed regions depends on properties of material to be processed and laser specifications, most often in practice it is defined experimentally.

An essential advantage of the apparatuses realizing the method according to the present invention is that various non-limiting embodiments of the focusing optical system 4 are composed from air-spaced optical components only. Thus, neither cemented optics is applied. Therefore, resistance of the components to laser radiation is defined by properties of optical coatings and polishing grade of optical surfaces. Modern state-off-the-art optical manufacturing techniques provide high damage thresholds and guarantee resistance of apparatuses according to the present invention to powerful laser radiation, especially for widely-used ultra-short pulse lasers.

One more essential advantage of the apparatuses realizing the method according to the present invention is aplanatic optical design of the focusing optical system 4, implying compensation of spherical aberration and coma aberration, happening while focusing inside the bulk material. This feature distinguishes the apparatuses according to the present invention from conventional optics that is designed to operate in air but is applied to focus laser radiation inside processed material.

In case of high NA conventional optics and beam focusing inside glass or another transparent material there exists strong spherical aberration, which leads to spreading of laser energy and reducing of efficiency of material processing. Examples of calculations using optical design software for a laser beam at 1064 nm wavelength being focused by an aberration-free lens with NA0.5 in air and at depth 0.8 mm inside sapphire is shown in FIGS. 2A-2G. FIG. 2A shows focusing lines with an aberration-free lens.

FIGS. 2B-2C shows a ray trace near focus, with FIG. 2B showing a focussed beam in air, and FIG. 2B shows a focussed beam inside a sapphire depth (0.8 mm) data.

FIGS. 2D-2E show spot views in a working plane that is a plane of maximum energy concentration with FIG. 2D showing a spot view in air and FIG. 2E showing a spot view inside a sapphire depth (0.8 mm).

FIGS. 2F-2G shows graph diagrams of encircled energy in the working plane. FIG. 2F shows images that relate to focusing in air. FIG. 2G shows graph diagrams inside sapphire.

The lens is aberration-free in air. Therefore, while a beam focusing in air it provides diffraction-limited spot size and maximum achievable energy concentration that can be characterized by a circle diameter where more than 80% of energy is concentrated. In the considered example the characteristic diameter is 1.5 µm. When focusing the laser beam using that lens inside sapphire the resulting spot size is defined by spherical aberration and is several times larger than the diffraction limited one. This reduces concentration of laser energy. The characteristic diameter is more than 10 µm and, hence, intensity is about 50 times less than one in case of focusing in air. The higher the optics NA or deeper is focusing inside processed materials, the larger is the spherical aberration and, hence, stronger energy dissipation.

Coma aberration appears in off-axis beams and has been described in literature (Smith, W. J., Modern Optical Engineering, McGraw-Hill, New York, 2000; Born, M. and Wolf, E., Principles of Optics, 7th edn., Cambridge University Press, Cambridge, 1999). Practically speaking, if design of an optical element does not presume compensation of coma, this aberration appears in case of misalignment of the optical element, and then it leads to spreading of laser energy.

Optical design of focusing optical systems 4 according to the present invention presumes compensation of coma aberration and spherical aberration induced by focusing inside bulk material, and is implemented, advantageously, as a multi-lens aplanatic optical system with birefringent lenses as well as lenses from isotropic materials. One of optical components of the focusing optical systems 4, for example one of lenses or a group of lenses, can be movable along optical axis and moving of that movable component can be used to compensate spherical aberration happening while light focusing inside the processed material workpiece.

As a non-limiting example, the focusing optical systems 4 can be implemented as a high NA multi-focus objective which last lens is aplanatic or close to aplanatic and is movable. Moving of the movable lens results inducing spherical aberration being opposite to spherical aberration induced by flat surface of a material workpiece while light focusing inside the workpiece, and value of aberration induced by the movable lens is determined by its position along optical axis with respect to rest optical components of the focusing optical systems 4.

Choosing an appropriate position setting of the movable lens provides full compensating, or overcompensating, or undercompensating of the aberration induced by light focusing inside the said workpiece. The control of aberration compensation factor by a movable lens allows an optimizing condition of material processing in particular laser technologies. An important feature of an aplanatic lens is simultaneous compensation of spherical aberration for all separate focuses at different depths inside bulk material that provides equal conditions of processing in different depths inside the bulk material under processing, maximized concentration of laser energy in multiple focuses, minimized losses and low sensitivity to misalignments of the focusing optical system 4.

Advantageously, the focusing optical system 4 according to present invention is implemented from birefringent and isotropic refractive materials which guarantees almost 100% efficiency, high resistance to high pulse energy of modern lasers, particularly of widely-used ultra-short pulse lasers, independence of efficiency and resulting energy distribution between focuses from size and quality of laser beam. In case of both $TEM_{00}$ and multimode lasers results are the same. This feature makes it possible to build robust industrial and scientific processing systems.

The material disruption realized by laser radiation focusing inside bulk material using focusing optical system according to present invention happens simultaneously in all multiple focuses. Therefore there appear mechanical stresses resulting in self-cleaving of material with low roughness cutting edge. For example, parameters of femtosecond pulse laser and scanning system can be optimized in such a way that the roughness of glass cutting edge can be characterized by $R_a<0.1$ µm, which means practically polished-like surface of a workpiece demonstrating high bending strength. This feature is very important in practice of cutting brittle materials.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An apparatus for laser material processing adapted to receive light from a laser source, to process a transparent or partially transparent material workpiece, the apparatus consisting of:
    at least one focusing optical system, each focusing optical system includes at least two lenses made from birefringent materials forming by polarization splitting at least three separate focuses along the optical axis, the focusing optical system includes at least one moveable lens or lens group which motion is used to compensate spherical aberration and coma aberration being induced by change of depth of light focusing inside the transparent or partially transparent material workpiece, and said compensation for said spherical aberration and the coma aberration is provided simultaneously for all separate focuses solely in each focusing optical system;
    a fixed holding device for locking the transparent or partially transparent material workpiece as an unmoved transparent or partially transparent material workpiece in X and Y coordinates; and
    a mechanical scanning device providing relative motion of the focusing optical system over the unmoved transparent or partially transparent material workpiece in order to realize the material processing effect along the processing path.

2. The apparatus according to claim 1, wherein optical components of the focusing optical system are air-spaced.

3. The apparatus according to claim 1, wherein the focusing optical system includes:
lenses formed from isotropic refractive materials.

4. The apparatus according to claim 1, wherein the movable lens is a last lens of the focusing optical system.

5. An apparatus for laser material processing adapted to receive light from a laser source, to process a transparent or partially transparent material workpiece, the apparatus consisting of:
- at least one focusing optical system, each focusing optical system includes at least two lenses made from birefringent materials forming by polarization splitting at least three separate focuses along the optical axis, the focusing optical system includes at least one moveable lens or lens group which motion is used to compensate spherical aberration and coma aberration being induced by change of depth of light focusing inside the transparent or partially transparent material workpiece, the focusing optical system includes
- waveplates to optimize polarization state of focused laser light, said waveplates located between or after the separate lenses of the focusing optical system;
- said compensation for said spherical aberration and the coma aberration is provided simultaneously for all separate focuses solely in each focusing optical system;
- a fixed holding device for locking the transparent or partially transparent material workpiece as an unmoved transparent or partially transparent material workpiece in X and Y coordinates; and
- a mechanical scanning device providing relative motion of the focusing optical system over the unmoved transparent or partially transparent material workpiece in order to realize the material processing effect along the processing path.

6. The apparatus according to claim 1, wherein the at least one lens or lens group of the focusing optical system is movable along the optical axis to vary the focal length of the focusing optical system and the distance between multiple focuses.

7. The apparatus according to claim 1, wherein the at least two lenses includes a combination of an objective and a quasi-afocal optical system comprising at least two birefringent lenses.

8. The apparatus according to claim 7, wherein the objective presents a zoom optical system.

9. The apparatus according to claim 7, wherein the mechanical scanning device includes:
a mirror-based optical scanner located between the objective and the quasi-afocal optical system.

* * * * *